(12) United States Patent
Chattin

US006805018B2

(10) Patent No.: US 6,805,018 B2
(45) Date of Patent: Oct. 19, 2004

(54) PORTABLE MULTI-SPEED, MULTI-INPUT, MULTI-OUTPUT DRIVE FOR POWER TAKE-OFF'S AND THE LIKE

(76) Inventor: Chester William Chattin, 221 Doyle Ave., Loogootee, IN (US) 47553

( * ) Notice: Subject to any disclaimer, the term of this patent is extended or adjusted under 35 U.S.C. 154(b) by 194 days.

(21) Appl. No.: 10/244,175

(22) Filed: Sep. 16, 2002

(65) Prior Publication Data

US 2004/0050198 A1 Mar. 18, 2004

(51) Int. Cl.[7] ............................. F16H 1/20; F16H 37/04
(52) U.S. Cl. ......................... 74/413; 74/15.2; 74/665 L
(58) Field of Search ....................... 74/11, 15.2, 665 L, 74/665 M, 665 N, 413

(56) References Cited

U.S. PATENT DOCUMENTS

| | | | | |
|---|---|---|---|---|
| 2,590,675 A | * | 3/1952 | Bottorff | ...................... 74/15.6 |
| 2,875,645 A | * | 3/1959 | Keyser | ...................... 74/665 N |
| 2,968,188 A | | 1/1961 | Du Shane et al. | |
| 2,975,643 A | * | 3/1961 | Ferguson | ...................... 74/15.2 |
| 3,279,275 A | | 10/1966 | Christie | |
| 3,352,165 A | | 11/1967 | Racine | |
| 3,464,277 A | | 9/1969 | Longshore | |
| 3,513,712 A | | 5/1970 | Zajichek et al. | |
| 3,715,704 A | * | 2/1973 | Boyle et al. | .................. 74/15.4 |
| 3,830,111 A | | 8/1974 | Travaglio | |
| 3,991,629 A | | 11/1976 | Dearnley | |
| 4,271,942 A | | 6/1981 | Ballendux | |
| 4,525,987 A | * | 7/1985 | Werner et al. | ................ 56/15.2 |
| 4,658,662 A | | 4/1987 | Rundle | |
| 4,685,340 A | * | 8/1987 | Shust et al. | ..................... 74/11 |
| 4,776,226 A | | 10/1988 | Zenker | |
| 4,953,346 A | * | 9/1990 | Aron | ........................... 56/11.1 |
| 5,344,230 A | * | 9/1994 | Kowalczyk et al. | ......... 366/100 |

* cited by examiner

Primary Examiner—William C. Joyce

(57) ABSTRACT

A gearbox containing two shafts connected internally causing the shafts to operate at different speeds. One shaft has a 21-spline female connection on one end with a 21-spline male connection on the other end. The other shaft has a 6-spline female connection on one end with a 6-spline male connection on the other end. The female end of one shaft can connect to the standard 1000-RPM power take-off shaft of a power unit. Alternatively, the female end of the other shaft can be connected to the standard 540-RPM power take-off shaft of a power unit. The output shafts operate at two different speeds; one at 540-RPM and the other at 1000-RPM. These output shafts connect to the standard 6-spline/21-spline female connection on driven equipment. By connecting the driven equipment to the matching spline shaft, the driven equipment will operate at the proper speed. It also provides capability to drive two units concurrently with one power unit. The most common use would be to connect the power take-off of farm or industrial power units to multi driven units or driven units with different RPM speed.

6 Claims, 6 Drawing Sheets

PORTABLE MULTI-SPEED, MULTI-INPUT, MULTI-OUTPUT DRIVE FOR POWER TAKE-OFF'S AND THE LIKE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The power take-off assemblies on farm and industrial equipment have been designed to operate at either 540-RPM with a standard 6-spline connection or at 1000-RPM with a standard 21-spline connection. Originally, the 540-RPM standard was used on the power unit as well as the driven unit. As larger tractors became more commonplace, the additional standard of 1000 RPM became quite common. This creates a problem when some equipment has been manufactured to operate at 540-RPM, while other equipment has been manufactured to operate at 1000-RPM. The same is true of the power units; they may operate at only one pre-selected speed. An operator with a power unit designed to operate at one speed could only utilize equipment designed to operate at the same RPM. Many current manufacturers have produced power units that can operate at either speed as an option on original equipment. Some attempts have been made to produce a portable unit which changes the input to output RPM, the portable unit can be mounted on different power units, and provides a single output shaft with a single input shaft. One shaft is a 6-spline shaft operating at 540-RPM and the other shaft is a 21-spline shaft operating at 1000-RPM. One major drawback to the current design is that it only provides for mounting on the power unit. It does not provide for mounting the unit on the driven equipment. Another shortcoming of the current design is that it allows for only one input shaft and one output shaft. Therefore, one unit is required to operate from a 6-spline 540-RPM power unit and another unit is required to operate from a 21-spline 1000-RPM power unit. Furthermore, this means in order to operate a power unit and a driven unit with compatible RPM, you must remove the portable unit from the power unit. These design flaws result in an adapter that is not practical because of the cost of three units, one to provide dual output, another to slow speed down to 540-RPM and another unit to increase speed up to 1000-RPM. It also becomes labor intensive because these units must constantly be mounted or removed as each application changes.

BRIEF SUMMARY OF THE INVENTION

The Portable Multi-Speed, Multi-Input, Multi-Output Drive for Power Take-Off and the Like provides a method for driving a machine at its designed speed even though the power unit is designed to operate at a different speed. While the invention is designed to connect the standard power take-off unit on a farm or industrial tractor, the connection can be applied to any power unit and the equipment it is to drive. The portable unit provides dual output shafts driven by either of two input shafts. The unit can also be mounted on either the power unit or the driven equipment. The driven equipment may be designed to operate at a selected number of RPM while the power unit may operate at a different predetermined RPM. For example some pieces of driven equipment such as a rotary mower may be designed to operate at 540-RPM, while other rotary mowers are designed to operate at 1000-RPM. If the driven unit, in this case the rotary mower, is designed to operate at 1000-RPM and the power unit, in this example the tractor, only operates at 540-RPM, this invention allows the driven unit to operate at 1000-RPM by attaching the driven unit to the high-speed output shaft while any power unit, such as a farm tractor, would be attached to the low-speed input shaft. If you have the reverse requirements, that is a 540-RPM driven requirement and a 1000-RPM power unit, you just attach the low-speed output shaft to the driven equipment and the high-speed shaft to the power unit. If both units are designed for the same speed, you attach both units to the same input and output shaft, either the low-speed or high-speed as appropriate. The invention has fewer parts, simpler design and the capability to use one unit to accommodate all possible connections as well as the capability to operate two output shafts concurrently from the same power unit.

The invention can also be mounted on the driven equipment either as original equipment, or as an add-on at a later date. Driven equipment with this invention added has the flexibility to be driven by a power unit with either standard speed. The ratio of the speed and rotation of the two shafts can be controlled by internal configuration within the gear case.

The major advantage of this invention over prior art is one unit replaces the need for three separate units; one for dual output, another for increased speed and still another for reduced speed. Another advantage is the labor saved in changing from one unit to another each time the driven equipment requirements change. This invention also allows the driven equipment to be adapted to match any power unit. No other prior art provides one unit which is portable, has multiple input to allow it to be connected to either standard power source, has multiply output to allow it to be connected to either standard driven unit, has the power shaft extending through the gear case allowing equipment of the same speed to be utilized without removing the invention, allows standard configurations to be connected without fear of accidentally operating the equipment at the wrong speed, and has multiple output to allow more than one piece of equipment to be driven from one power unit.

DETAIL DESCRIPTION OF THE INVENTION

The Portable Multi-Speed, Multi-Input, Multi-Output Drive for Power Take-Off and the Like provides a method for driving a machine at its designed speed even though the power unit is designed to operate at a different speed. While the invention is designed to connect the standard power take-off unit on a farm or industrial tractor, the connection can be applied to any power unit and the equipment it is to drive. The portable unit provides dual output shafts driven by either of two input shafts. The unit can also be mounted on either the power unit or the driven equipment. The driven equipment may be designed to operate at a selected number of RPM while the power unit may operate at a different predetermined RPM. For example some pieces of driven equipment such as a rotary mower may be designed to operate at 540-RPM, while other rotary mowers are designed to operate at 1000-RPM. If the driven unit, in this case the rotary mower, is designed to operate at 1000-RPM and the power unit, in this example the tractor, only operates at 540-RPM, this invention allows the driven unit to operate at 1000-RPM by attaching the driven unit to the high-speed output shaft while any power unit, such as a farm tractor, would be attached to the low-speed input shaft. If you have the reverse requirements, that is a 540-RPM driven requirement and a 1000-RPM power unit, you just attach the low-speed output shaft to the driven equipment and the high-speed shaft to the power unit. If both units are designed for the same speed, you attach both units to the same input and output shaft, either the low-speed or high-speed as appropriate. The invention has fewer parts, simpler design and the capability to use one unit to accommodate all possible connections as well as the capability to operate two output shafts concurrently from the same power unit.

The invention can also be mounted on the driven equipment either as original equipment, or as an add-on at a later date. Driven equipment with this invention added has the flexibility to be driven by a power unit with either standard speed. The ratio of the speed and rotation of the two shafts can be controlled by internal configuration within the gear case.

The major advantage of this invention over prior art is one unit replaces the need for three separate units; one for dual output, another for increased speed and still another for reduced speed. Another advantage is the labor saved in changing from one unit to another each time the driven equipment requirements change. This invention also allows the driven equipment to be operated in almost any position by keeping the oil vent plug above, and the oil drain plug below, the center of the unit.

Figure 1:
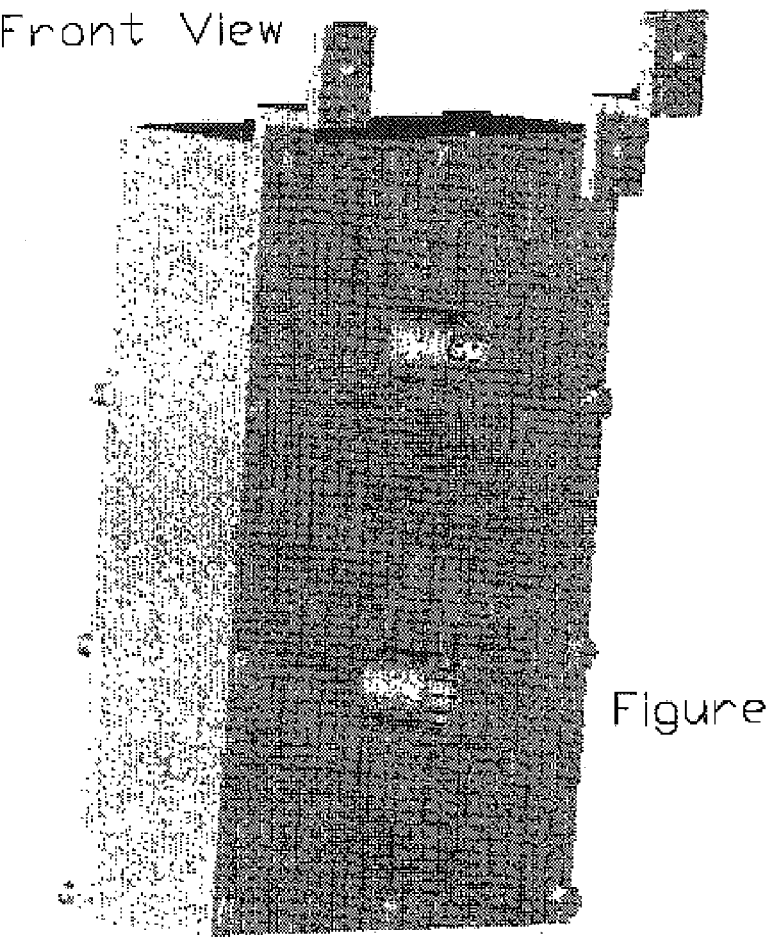
FIG. 1. Portable Multi-Speed, Multi-Input, Multi-Output Drive for Power Take-Offs and the Like—Left Front View.
Figure 2:
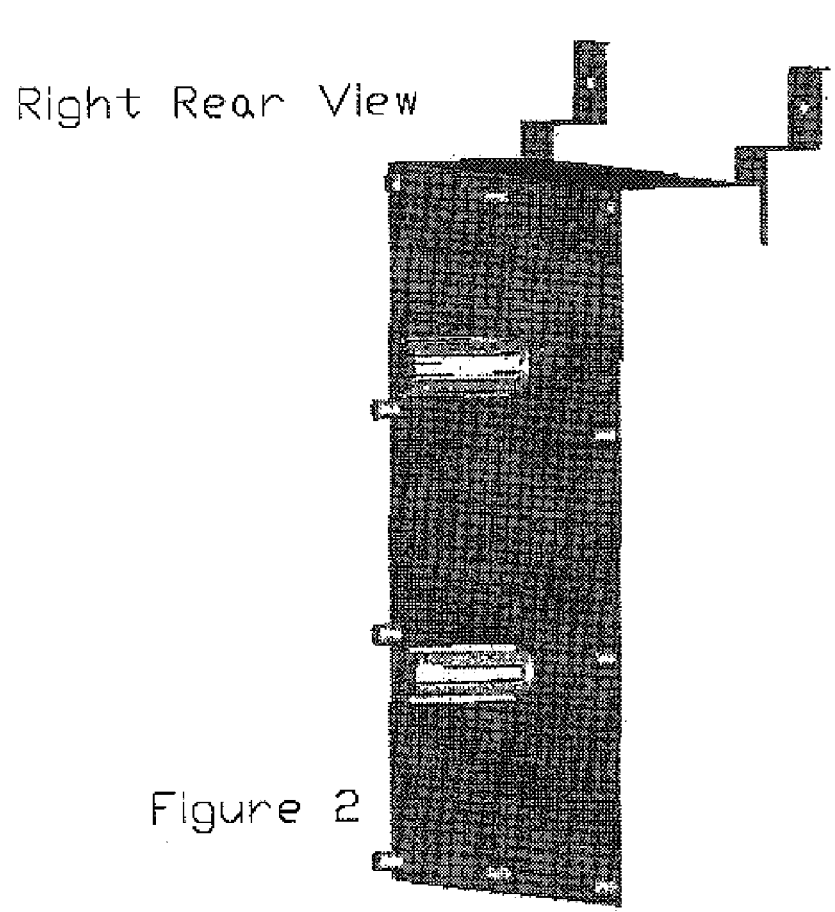
FIG. 2. Portable Multi-Speed, Multi-Input, Multi-Output Drive for Power Take-Offs and the Like—Right Rear View.
Figure 3:
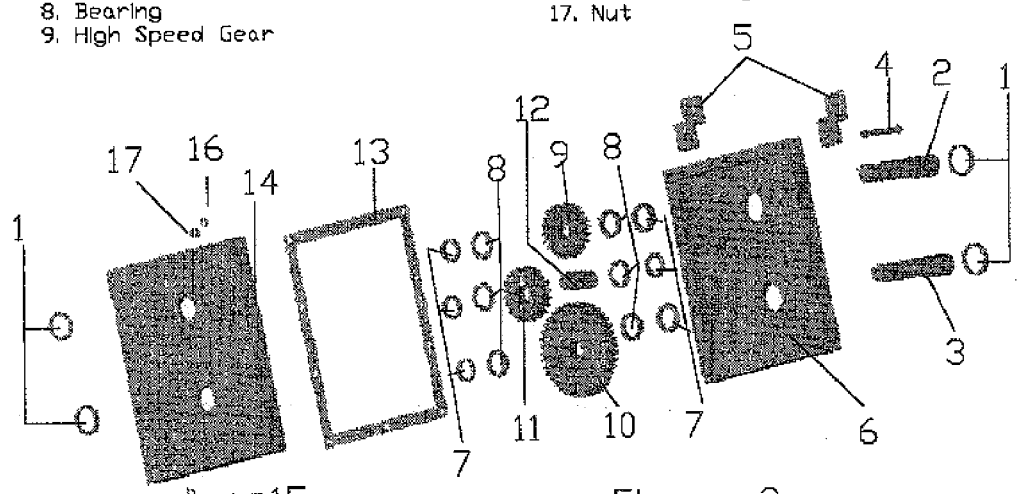
FIG. 3. Portable Multi-Speed, Multi-Input, Multi-Output Drive for Power Take-Offs and the Like—Parts List.
Figure 4:
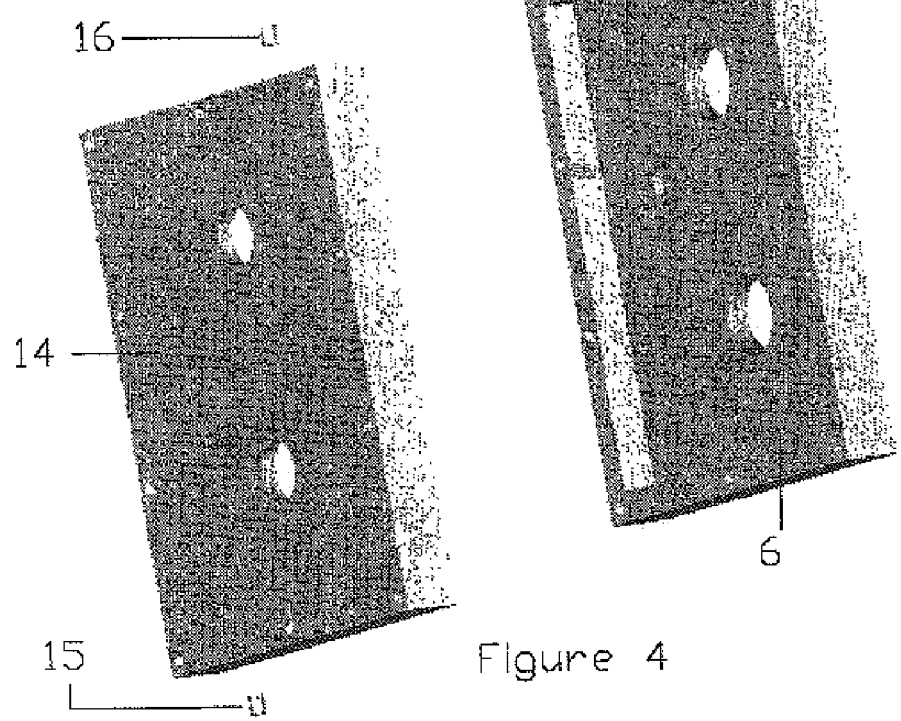
FIG. 4. Portable Multi-Speed, Multi-Input, Multi-Output Drive for Power Take-Offs and the Like—Gear Case with Plugs.
Figure 5:
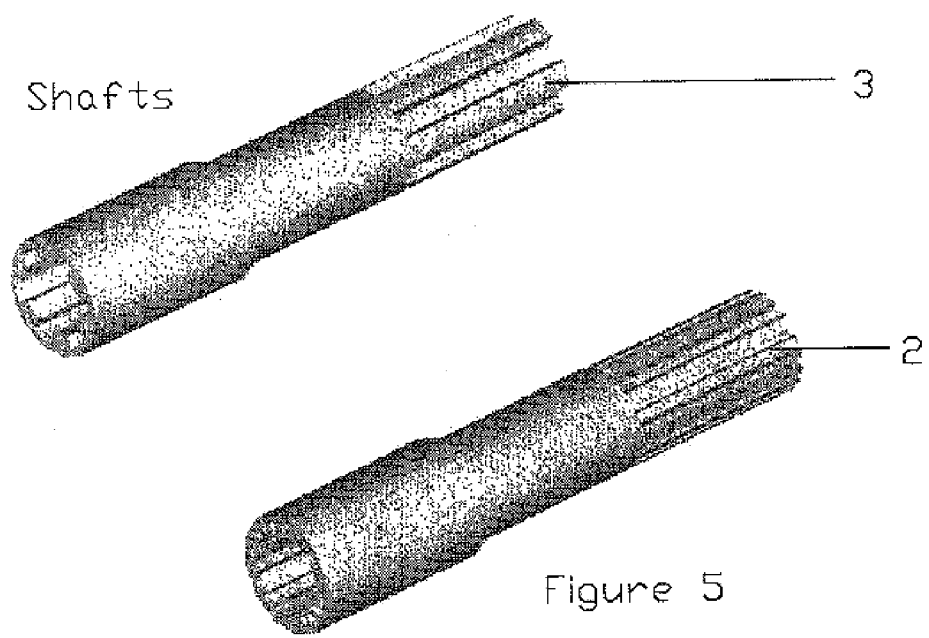
FIG. 5. Portable Multi-Speed, Multi-Input, Multi-Output Drive for Power Take-Offs and the Like—Shafts.
Figure 6:
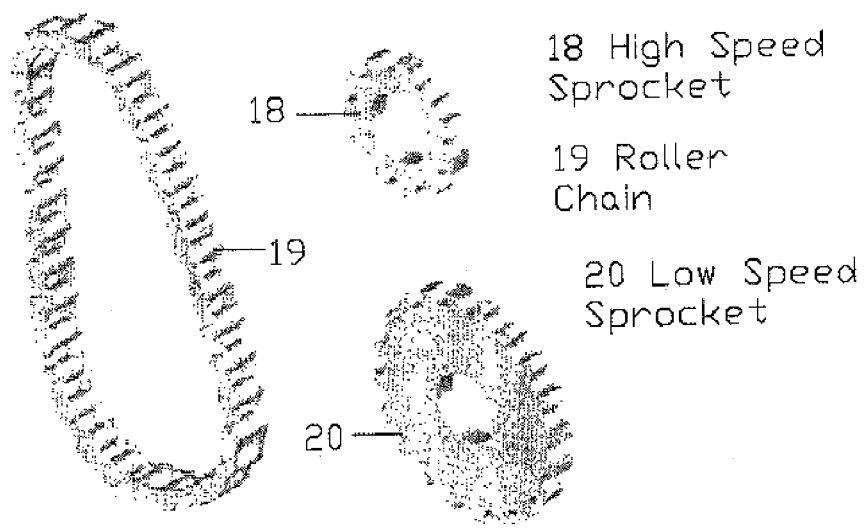
FIG. 6. Portable Multi-Speed, Multi-Input, Multi-Output Drive for Power Take-Offs and the Like—Subsitute parts for Chain Driven.

The shafts of the invention can be connected by means other than gears. The following is an example of how one such conversion could be accomplished. FIG. 6 lists replacement parts that could be used to convert to a roller chain/sprocket configuration. In order to convert the gear driven to a chain driven unit, the idler gear shaft <12>, the idler gear <11>, along with the associated races <7> and bearings <8> are removed. The high-speed gear <9> and the low-speed gear <10> are replaced by the high-speed sprocket <18> and low-speed sprocket <20> respectfully, as shown in FIG. 6. The roller chain <19> in FIG. 6 is added to connect the two sprockets. The chain and sprockets can vary in size and can be multi-strand for additional strength.

The invention is portable and can be mounted on a power unit, such as the power take-off of a farm tractor, with a power take-off speed of 540 or 1000-RPM. It has one shaft that has a female 21-spline connection on the front end which can be attached to the power unit, and a male 21-spline connection on the rear end which can be attached to the driven equipment. The invention also has another shaft that has a 6-spline connection on the front end that can be attached to the power unit and a male 6-spline connection on the rear end, which can be connected to the driven equipment. The shafts are connected on the inside of the gearbox in a way to cause the slave shaft to turn at a different speed than the power shaft. Whether you connect the 540-RPM shaft <3> to the power unit, or the high-speed shaft <2> to the power unit, the two output shafts will be turning at the desired speed; in this case one at 1000-RPM and the other at 540-RPM. Prior art for a portable unit seems to require one unit to increase the output speed, another to decrease the output speed, another to provide capability to operate two driven units concurrently, and the removal of the portable unit to operate a driven unit with the same speed requirement as the power unit. As long as the equipment has not been altered, you have a safety feature where you cannot accidentally connect the equipment to operate at the incorrect speed.

This unit can also be mounted on the driven equipment as original equipment or as a after market modification to older equipment, making the driven equipment compatible with a power unit turning at 540 or 1000-RPM Of course, the internal configuration can be modified to allow the two output shafts to turn at any desired speed ratio. With multiple output shafts, this also gives the capability to drive different parts of the machine at different speeds.

I claim:

1. A portable gear arrangement comprising a first shaft, a second shaft, a power transmission mechanism connecting the shafts, the power transmission mechanism being at least one of a gear arrangement or a chain and sprocket arrangement, each of the shafts having an input end configured to be directly connected to a power unit and an output end configured to be directly connected to a driven device, wherein the gear arrangement being configured to provide a speed reduction when the input end of the first shaft is connected to the power unit and the output end of the second shaft is connected to the driven device, and the gear arrangement being configured to provide a speed increase when the input end of the second shaft is connected to the power unit and the output end of the first shaft is connected to the driven device.

2. The gear arrangement of claim 1, wherein one of the shafts having a female end for connecting to the power unit and a male end for connecting to the driven unit with both ends having a 21-spline connector.

3. The gear arrangement of claim 1, wherein one of the shafts having a female end for connecting to the power unit and a male end for connecting to the driven unit with both ends having a 6-spline connector.

4. The gear arrangement of claim 1 having one gear on each shaft and an idler gear to cause the shafts to rotate in the same direction.

5. The gear arrangement of claim 1 having a sprocket on each shaft connected by a chain.

6. A gear arrangement for agricultural machines comprising a first shaft, a second shaft, a power transmission mechanism connecting the shafts, the power transmission mechanism being at least one of a gear arrangement or chain and sprocket arrangement, each of the shafts having an input end configured to be directly connected to a power unit and an output end configured to be directly connected to a driven device, the input end of the first shaft having a 6-spline connector for attachment to the power unit, the input end of the second shaft having a 21 spline connector for attachment to the power unit, wherein the gear arrangement being configured to provide a speed increase when the input end of the first shaft is connected to the power unit and the output end of the second shaft is connected to the driven device, and the gear arrangement being configured to provide a speed reduction when the input end of the second shaft is connected to the power unit and the output end of the first shaft is connected to the driven device.

* * * * *